(12) United States Patent
Drury et al.

(10) Patent No.: US 9,266,389 B2
(45) Date of Patent: Feb. 23, 2016

(54) WHEEL SYSTEM FOR A VEHICLE

(71) Applicant: The Boeing Company, Seal Beach, CA (US)

(72) Inventors: Anthony D. Drury, Woodinville, WA (US); Richard Randon Durbin, Mukilteo, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 13/946,321

(22) Filed: Jul. 19, 2013

(65) Prior Publication Data

US 2015/0021873 A1 Jan. 22, 2015

(51) Int. Cl.
| | |
|---|---|
| *B60C 5/02* | (2006.01) |
| *B60C 5/10* | (2006.01) |
| *B60C 5/24* | (2006.01) |
| *B60B 19/04* | (2006.01) |
| *B60B 31/00* | (2006.01) |
| *B60B 37/10* | (2006.01) |
| *B60C 5/20* | (2006.01) |
| *B60C 7/12* | (2006.01) |
| *B60C 23/04* | (2006.01) |
| *B60C 5/18* | (2006.01) |

(52) U.S. Cl.
CPC .............. *B60B 19/04* (2013.01); *B60B 31/00* (2013.01); *B60B 37/10* (2013.01); *B60C 5/18* (2013.01); *B60C 5/20* (2013.01); *B60C 5/24* (2013.01); *B60C 7/125* (2013.01); *B60C 23/0496* (2013.01); *B60C 2200/14* (2013.04)

(58) Field of Classification Search
CPC ........ B60C 5/20; B60C 7/125; B60C 23/0496
USPC ........ 280/80.1; 152/157, 331.1, 337.1, 338.1, 152/339.1, 317
See application file for complete search history.

(56) References Cited

U.S. PATENT DOCUMENTS

| | | | | |
|---|---|---|---|---|
| 804,088 | A * | 11/1905 | Blakeslee | 152/337.1 |
| 2,299,243 | A * | 10/1942 | Mayer, Sr. | 152/331.1 |
| 2,415,616 | A * | 2/1947 | Wallace | 152/339.1 |
| 2,859,791 | A * | 11/1958 | Pellegrino | 152/334.1 |
| 3,185,960 | A * | 5/1965 | Howard et al. | 340/442 |
| 3,256,123 | A * | 6/1966 | Hart | 29/894.37 |
| 3,291,181 | A | 12/1966 | Havens | |
| 3,438,419 | A * | 4/1969 | Barbera | 152/338.1 |
| 3,805,912 | A | 4/1974 | Mattson | |
| 4,606,524 | A | 8/1986 | Conee | |
| 4,685,501 | A * | 8/1987 | Williams | 152/417 |
| 5,583,482 | A * | 12/1996 | Chamussy et al. | 340/442 |

(Continued)

FOREIGN PATENT DOCUMENTS

| | | |
|---|---|---|
| FR | 1 005 870 A | 4/1952 |
| GB | 138 553 A | 2/1920 |

OTHER PUBLICATIONS

International Search Report and Written Opinion in PCT/US2014/036027 mailed Oct. 8, 2014.

*Primary Examiner* — Karen Beck
(74) *Attorney, Agent, or Firm* — Armstrong Teasdale LLP (57) ABSTRACT

A wheel assembly for use with a vehicle is provided. The wheel assembly includes a first inner wheel portion, a second inner wheel portion positioned adjacent to the first inner wheel portion, a first wheel bladder coupled to the first inner wheel portion, and a second wheel bladder coupled to the second inner wheel portion.

19 Claims, 6 Drawing Sheets

(56) References Cited

U.S. PATENT DOCUMENTS

| | | | |
|---|---|---|---|
| 5,938,868 A * | 8/1999 | Miura et al. | 152/331.1 |
| 6,128,952 A * | 10/2000 | LeBlanc | 73/460 |
| 6,568,443 B2 * | 5/2003 | Shoner | 152/157 |
| 6,588,473 B1 * | 7/2003 | Walrond | 152/331.1 |
| 6,725,895 B1 * | 4/2004 | Tsipov | 152/415 |
| 6,889,543 B2 * | 5/2005 | Gautier | 73/146.4 |
| 7,207,365 B2 * | 4/2007 | Nelson et al. | 152/417 |
| 7,887,018 B2 | 2/2011 | Carnevali | |
| 7,984,736 B1 * | 7/2011 | Shoner | 152/157 |
| 8,371,350 B2 * | 2/2013 | Collet et al. | 152/417 |
| 2004/0112495 A1 * | 6/2004 | Weise | 152/331.1 |
| 2005/0229690 A1 * | 10/2005 | Kikuchi et al. | 73/146 |
| 2009/0313853 A1 | 12/2009 | Tadin | |
| 2010/0116400 A1 | 5/2010 | Yamaguchi | |
| 2010/0180995 A1 * | 7/2010 | Teratani et al. | 152/157 |
| 2013/0048175 A1 * | 2/2013 | Korus | 152/331.1 |
| 2013/0233459 A1 * | 9/2013 | Hall | 152/331.1 |
| 2014/0027032 A1 * | 1/2014 | Frantzen et al. | 152/450 |

* cited by examiner

WHEEL SYSTEM FOR A VEHICLE

BACKGROUND

The field of the disclosure relates generally to a wheel system for a vehicle, and more specifically, to a wheel system that enables a vehicle to traverse uneven or unstable terrain more effectively.

Generally, as known vehicles travel or traverse over uneven or unstable terrain, the vehicle may become stalled or immovable as different wheels lose traction with the terrain.

BRIEF SUMMARY

A wheel assembly for use with a vehicle is provided. The wheel assembly includes a first inner wheel portion, a second inner wheel portion positioned adjacent to the first inner wheel portion, a first wheel bladder coupled to the first inner wheel portion, and a second wheel bladder coupled to the second inner wheel portion.

In another aspect, a wheel system for use with a vehicle is provided. The wheel system includes an axle assembly and a wheel assembly coupled to the axle assembly. The wheel assembly including a first inner wheel portion, a second inner wheel portion positioned adjacent to the first inner wheel portion, a first wheel bladder coupled to the first inner wheel portion, and a second wheel bladder coupled to the second inner wheel portion.

In yet another aspect, a method of fabricating a wheel system for use with a vehicle is provided. The method includes providing an axle assembly and coupling a wheel assembly to the axle assembly. The wheel assembly including a first inner wheel portion, a second inner wheel portion positioned adjacent to the first inner wheel portion, a first wheel bladder coupled to the first inner wheel portion, and a second wheel bladder coupled to the second inner wheel portion.

The features, functions, and advantages that have been discussed can be achieved independently in various embodiments or may be combined in yet other embodiments, further details of which can be seen with reference to the following description and drawings.

DETAILED DESCRIPTION

The embodiments described herein enable provide a wheel system that may be used with a vehicle traversing uneven or unstable terrain.

Figure 1:
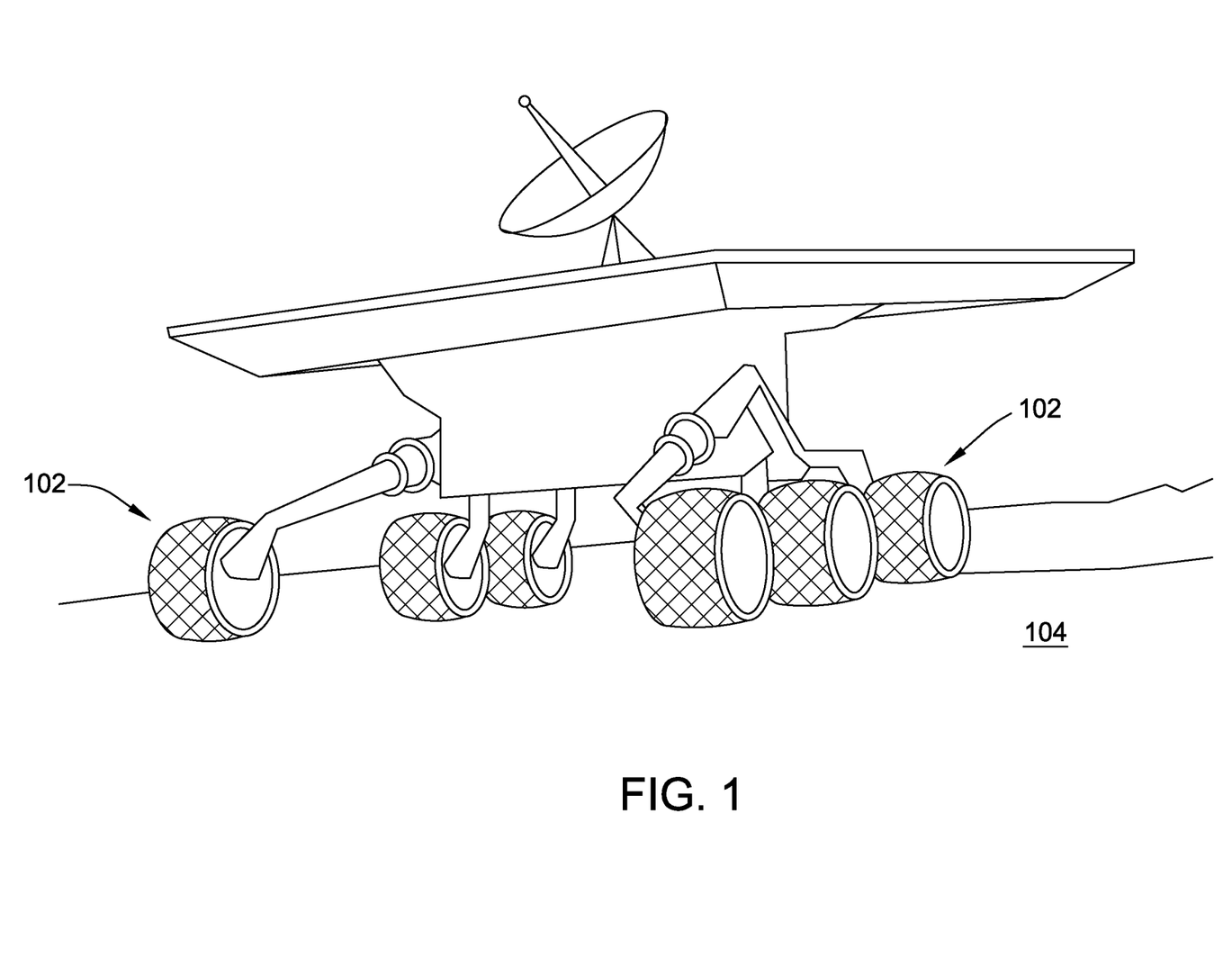
FIG. 1 is a perspective view of an exemplary known vehicle.

FIG. 1 is a perspective view of an exemplary vehicle 100 that may be used to traverse relatively unstable ground. In the exemplary embodiment, vehicle 100 includes a plurality of wheel systems 102 that may be used to traverse relatively unstable terrain 104. In one embodiment, vehicle 100 is a watercraft used to navigate a terrain 104, such as a seabed. Alternatively, vehicle 100 may be any vehicle traversing any terrain including, but not limited to automobiles and/or spacecraft.

Vehicle 100 includes a computing device (not shown) on-board that facilitates optimizing movement of vehicle 100 over terrain 104. The computing device includes at least one memory device and a processor that is coupled to the memory device for executing instructions. In some embodiments, executable instructions are stored in the memory device. In the exemplary embodiment, the computing device performs one or more operations described herein by programming the processor. For example, the processor may be programmed by encoding an operation as one or more executable instructions and by providing the executable instructions in the memory device.

In the exemplary embodiment, the computing device also includes a communication interface that is coupled to the processor. The communication interface communicates with a user locally or remotely to command vehicle 100. To communicate with vehicle 100, the communication interface may include, for example, a wired network adapter, a wireless network adapter, and/or a mobile telecommunications adapter.

Figure 2:
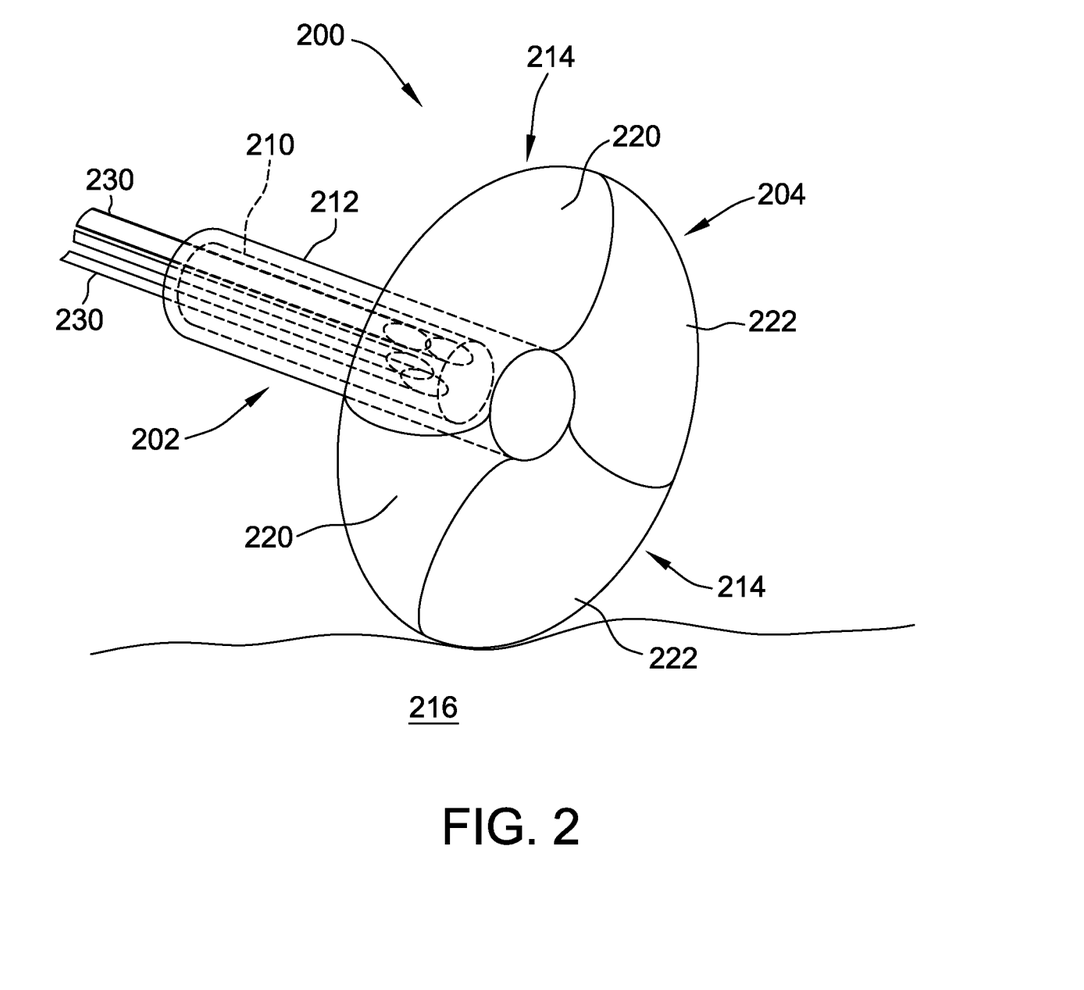
FIG. 2 is perspective view of an exemplary wheel system that may be used with the vehicle shown in FIG. 1.

FIG. 2 is perspective view of an exemplary wheel system 200 that may be used with vehicle 100 (shown in FIG. 1). In the exemplary embodiment, wheel system 200 includes an axle assembly 202 coupled to a wheel assembly 204. Axle assembly 202 includes an inner axle 210 and an outer axle 212 that rotates about inner axle 210. Wheel assembly 204 includes a plurality of wheel segments 214 that are adjacent to each other. Segments 214 are selectively inflatable and deflatable to conform to a terrain 216. In one embodiment, wheel assembly 204 includes four wheel segments 214. Alternatively, wheel assembly 204 can have any number of wheel segments 214 that facilitates optimizing travel of vehicle 100 over terrain 216 as described herein.

In the exemplary embodiment, wheel segments 214 include an inner wheel portion 220 that is coupled to a wheel bladder 222. In some embodiments, wheel portion 220 is substantially rigid and is fabricated from viton, neoprene or natural rubber material, or a combination thereof. Alternatively, wheel portion 220 can be fabricated from any material that facilitates vehicle 100 traversing terrain 216. In one embodiment, wheel portion 220 is a pneumatic vehicle tire that is designed to resist the effects of deflation when punctured (e.g., a run-flat tire).

Wheel bladder 222 is coupled to wheel portion 220 such that wheel bladder 222 is selectively inflatable and deflatable to conform to terrain 216. In the exemplary embodiment, wheel bladder 222 is fabricated from a flexible rubber composite material that is substantially resistant to punctures. Alternatively, bladder 222 can be fabricated from any material that facilitates vehicle traversing terrain 216. In operation, as wheel assembly 204 rotates over terrain 216, segments 214 in contact with terrain 216 are deflated and suction applied to substantially conform segments 214 to terrain 216 to facilitate segments 214 gripping and/or optimizing contact with terrain 216. As segments 214 are rotated off of terrain 216, segments 214 are inflated to release their conformity with terrain 216.

In the exemplary embodiment, inner axle 210 houses a plurality of inflation devices 230 that induce suction and/or pressure to wheel bladder 222 to cause bladder 222 to selectively inflate or deflate. In some embodiments, inflation devices 230 are hoses that are coupled to an air pump (not shown) to provide suction and/or pressure as needed by bladder 222.

Figure 3:
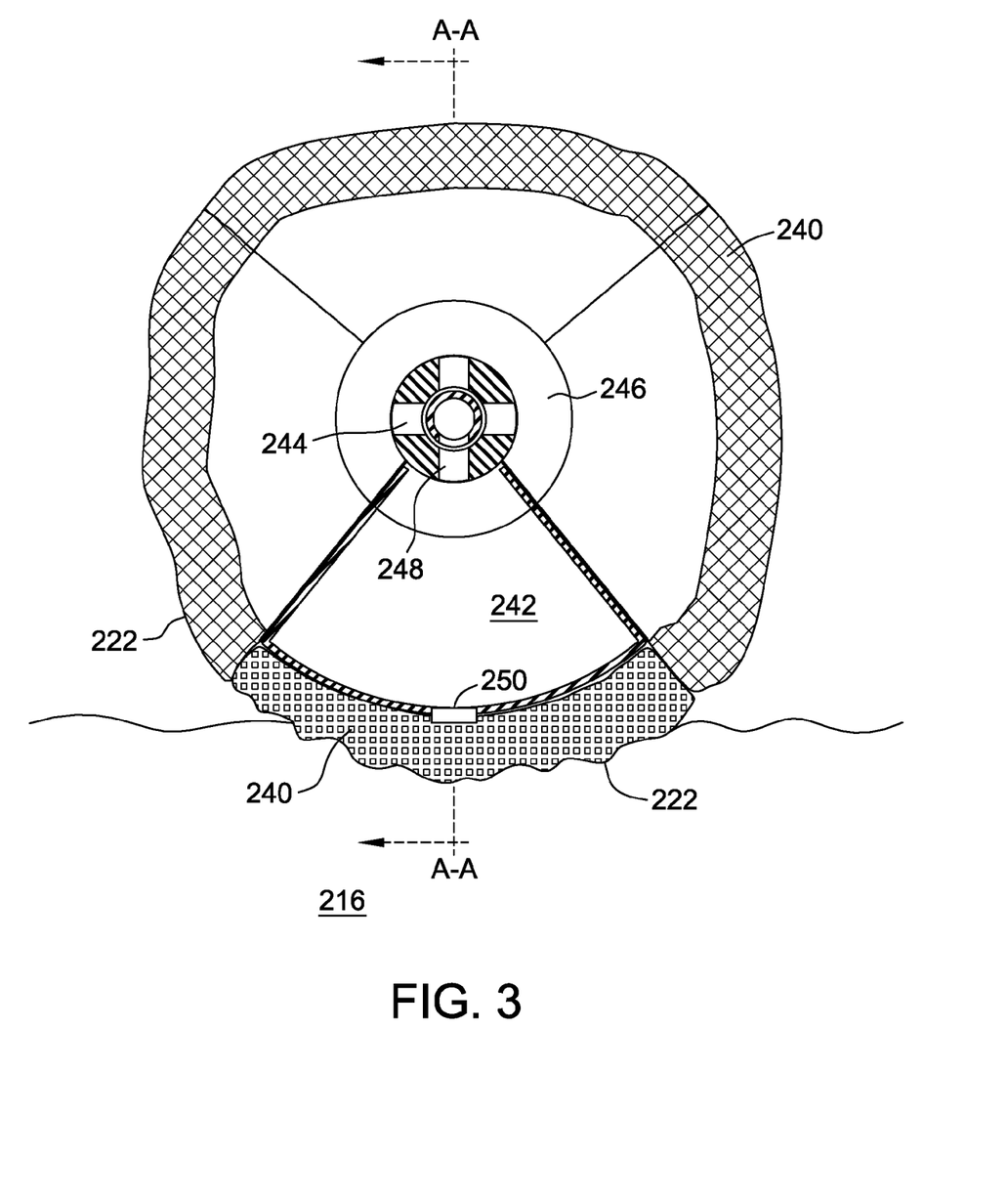
FIG. 3 is a side partial cut-away view of the wheel system shown in FIG. 2.
Figure 4:
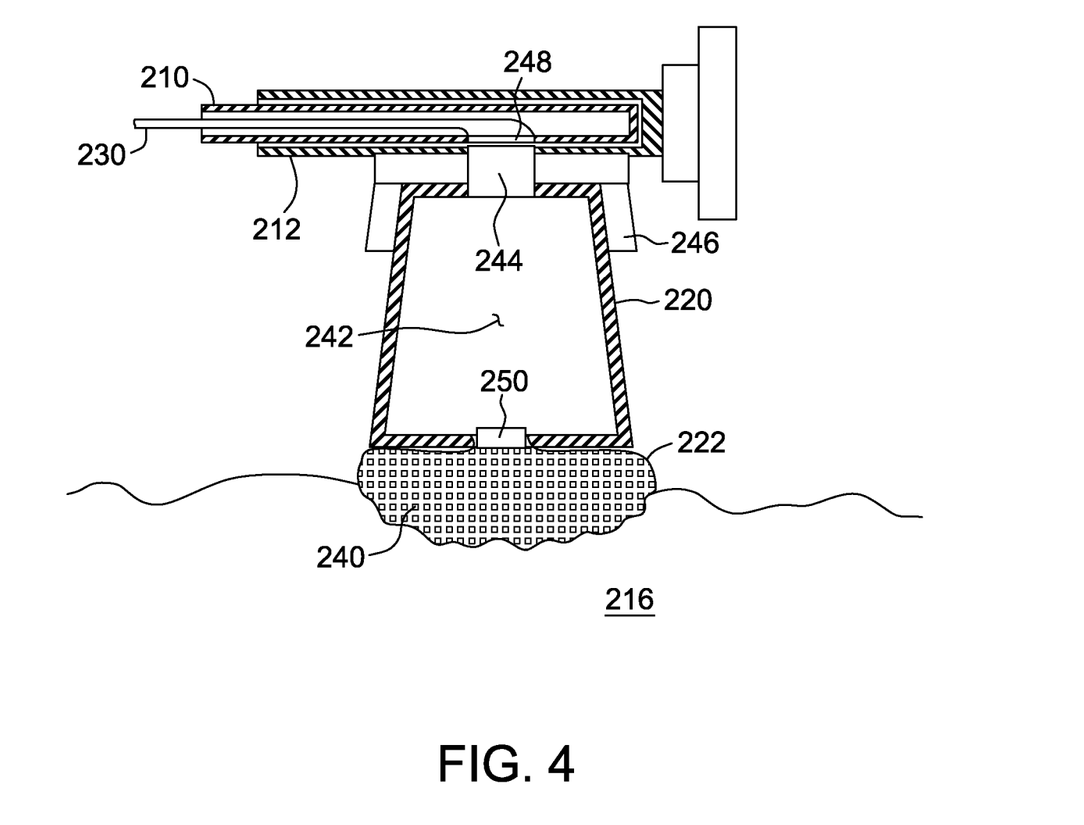
FIG. 4 is a cut-away view of the wheel system shown in FIG. 3 and taken along line A-A.

FIG. 3 is a side partial cut-away view of wheel system 200, and FIG. 4 is a cut-away view of wheel system 200 taken along line A-A. As described above, in the exemplary embodiment, as wheel assembly 204 rotates over terrain 216, segments 214 in contact with terrain 216 have a vacuum selectively applied thereto to substantially conform segments 214 to terrain 216 to grip and/or to remain in contact with terrain 216. In one embodiment, bladders 222 are substantially filled with granules 240. Granules 240 may be multi-faceted to facilitate optimizing contact with terrain 216 by lying substantially flush against at least a portion of terrain 216. In the exemplary embodiment, granules are selected according to a vehicle size and a terrain over which vehicle 100 will be travelling. For example, a vehicle 100 traversing over delicate terrain may use granules 240 sized similarly to coffee grounds and a vehicle 100 operating as an earth mover may use granules 240 sized similarly to pea gravel. Alternatively, granules 240 can be any material that facilitates optimizing contact between segments 214 and terrain 216, such as, but not limited to, shell husks, gravel, and/or birdshot sized pellets.

Referring to FIG. 4, suction and/or pressure is provided to bladder 222 from inflation device 230. In the exemplary embodiment, wheel portion 220 includes a chamber 242 that is used to create a vacuum or increase an operating pressure within bladder 222. Wheel portion 220 also includes a wheel portion aperture 244 that is configured to mate with inflation device 230 to enable device 230 to selectively provide suction and/or pressure as needed. In the exemplary embodiment, wheel portion aperture 244 extends through wheel portion 220, through outer axle 212, and through wheel rim 246 used to couple wheel portion 220 to outer axle 212. In some embodiments, device 230 is coupled to an inflation aperture 248 that substantially mates with wheel portion aperture 244. In some embodiments, a filter 250 is coupled to bladder 222 and/or wheel portion 220 to substantially prevent granules 240 from entering chamber 242.

Similar to the selection of granules 240, suction or vacuum pressure can be selected based on vehicle size and the intended environment of vehicle 100. For example, a vehicle traversing terrain having a localized pressure that is greater than on Earth's surface, (e.g., underwater or on another planet) may require a vacuum pressure to be induced to bladder 222 to facilitate bladder 222 maintaining contact with the terrain 216. Alternatively, a vehicle travelling over sand or snow may require an increase in traction that could be provided by inducing vacuum pressure on bladder 222. In the exemplary embodiment, the vacuum induced to bladder 222 is in the range of 0 to 10 psia. Alternatively, any pressure can be used that facilitates vehicle 100 traversing terrain 216.

Figure 5:
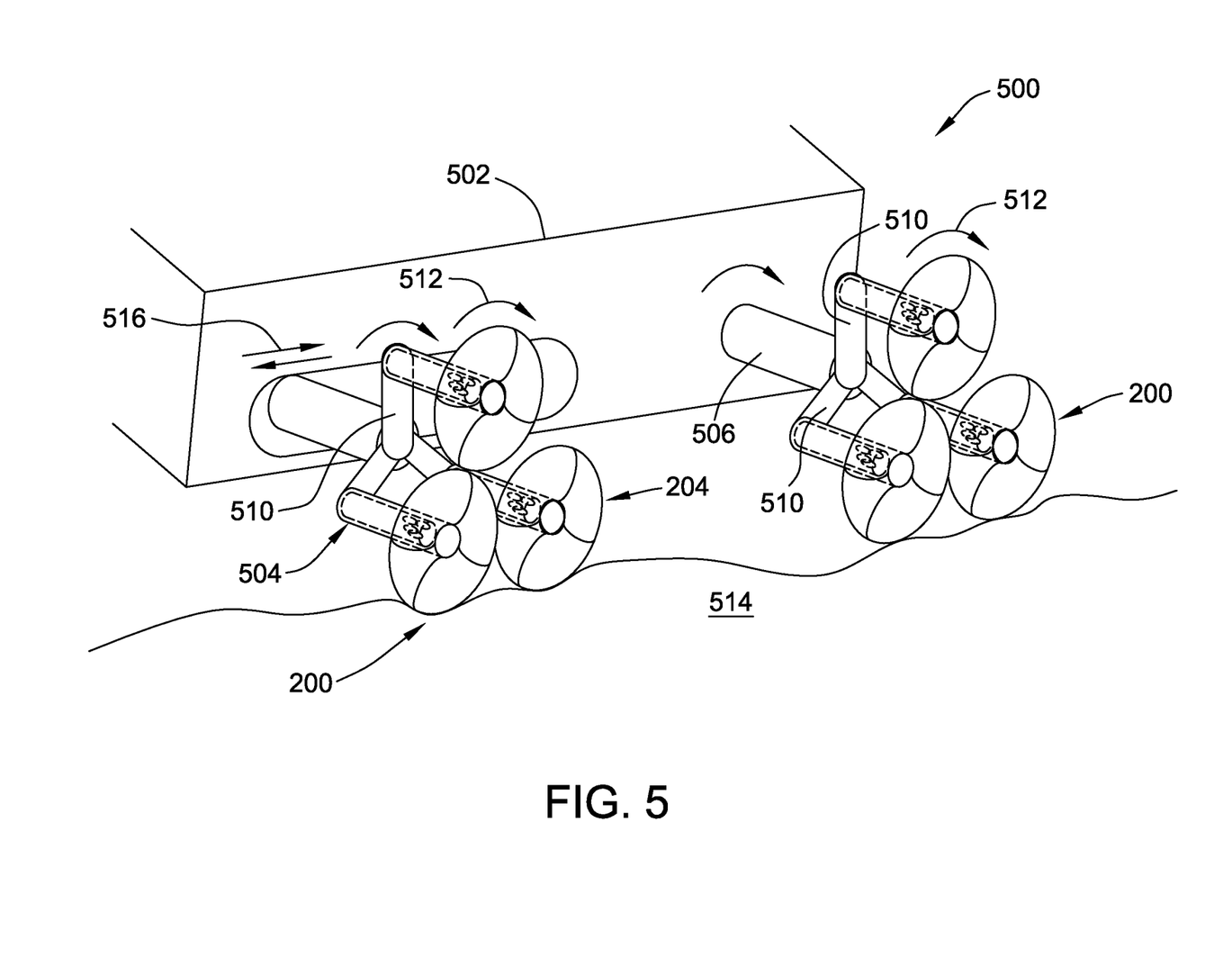
FIG. 5 is a perspective view of an alternative wheel system that may be used with the vehicle shown in FIG. 1.

FIG. 5 is a perspective view of an alternative wheel system 500 for use with a vehicle 502, such as vehicle 100 shown in FIG. 1. In the exemplary embodiment, vehicle 502 includes a first leg segment 504 and a second leg segment 506. Each leg segment 504 and 506 is coupled to three wheel systems 200 via linking arms 510. Wheel assemblies 204 of wheel systems 200 move in a rotational direction 512 to traverse terrain 514. In one embodiment, in addition to the rotation of wheel assembly 204, wheel system 200 is rotated via movement of linking arms 510 in direction 512. In such an embodiment, if a wheel system 200 was placed in a crevice in terrain 514, vehicle 502 could continue movement by rotating a subsequent wheel system 200 forward. In some embodiments, additional movement of vehicle 502 is accomplished via a lateral movement 516 of leg segments, such as first leg segment 504. While vehicle 502 is shown having two leg segments 504 and 506 with three wheel systems 200 on each leg segment 504 and 506, any number of leg segments having any number of wheel assemblies can be used.

Figure 6:
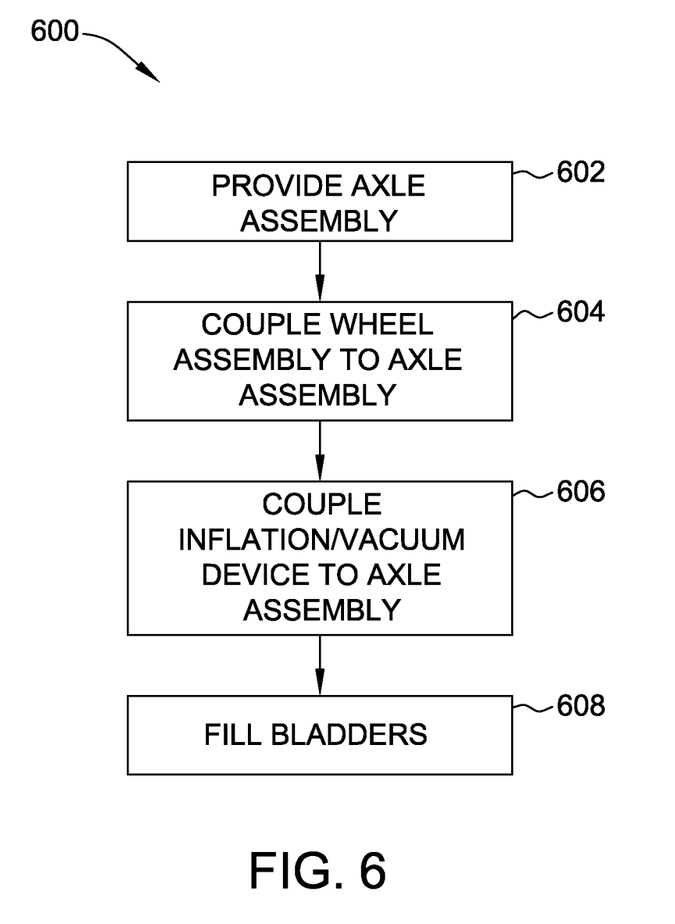
FIG. 6 is a flowchart of an exemplary method that may be implemented to fabricate the wheel system shown in FIG. 2.

FIG. 6 is a flowchart of an exemplary method 600 that may be implemented to fabricate wheel system 200 (shown in FIG. 2). In the exemplary embodiment, axle assembly 202 is provided 602 and wheel assembly 204 is coupled 604 to axle assembly 202. Inflation device 230 is coupled 606 to axle assembly 202. In some embodiments, a vacuum device is also coupled 606 to axle assembly 202, the vacuum device configured to selectively provide suction as needed. In the exemplary embodiment, bladders 222 are substantially filled 608 with granules or air, or both.

The embodiments described herein provide a wheel system for use with a vehicle traversing uneven or unstable terrain. The wheel system provides vehicles additional traction while traversing over terrain. Additionally, in environments in which local pressure is greater, the wheel system provided herein enables vehicles to traverse terrain effectively.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A wheel assembly for use with a vehicle, said wheel assembly comprising:
a first inner wheel portion comprising a first plurality of walls that combine to define a substantially hollow first chamber;
a second inner wheel portion positioned adjacent to said first inner wheel portion, said second inner wheel portion comprising a second plurality of walls that combine to define a substantially hollow second chamber;
a first wheel bladder comprising a first radially inner wall coupled to a radially outer wall of said first plurality of walls such that said first wheel bladder is positioned radially outward from said first inner wheel portion, said first chamber configured to induce suction, pressure, or both to said first wheel bladder; and
a second wheel bladder comprising a second radially inner wall coupled to a radially outer wall of said second plurality of walls such that said second wheel bladder is positioned radially outward from said second inner wheel portion, wherein the wheel assembly is coupled to an axle assembly including an inner axle and an outer axle configured to rotate about the inner axle, the inner axle configured to retain an inflation device for inducing at least one of suction and pressure to the wheel assembly.

2. The wheel assembly according to claim 1, wherein each of said first and second wheel bladders is substantially filled with granules, wherein said granules are selected based on at least one of a size of the vehicle and on a terrain over which said vehicle is configured to travel.

3. The wheel assembly according to claim 1, wherein each of said first and second wheel bladders is selectively inflatable and deflatable to a vacuum based on a terrain over which said vehicle is configured to travel.

4. The wheel assembly according to claim 1, further comprising a first filter coupled to said first wheel bladder or said first inner wheel portion, or both.

5. The wheel assembly according to claim 1, further comprising a second filter coupled to said second wheel bladder or said second inner wheel portion, or both.

6. The wheel assembly according to claim 1, further comprising a third inner wheel portion coupled to a third wheel bladder.

7. A wheel system for use with a vehicle, said wheel system comprising:
   an axle assembly comprising an inner axle and an outer axle configured to rotate about said inner axle; and
   a first wheel assembly coupled to said axle assembly, wherein said inner axle of said axle assembly is configured to retain an inflation device for inducing at least one of suction and pressure to said first wheel assembly, said first wheel assembly comprising:
      a first inner wheel portion comprising a first plurality of walls that combine to define a substantially hollow first chamber;
      a second inner wheel portion positioned adjacent to said first inner wheel portion, said second inner wheel portion comprising a second plurality of walls that combine to define a substantially hollow second chamber;
      a first wheel bladder comprising a first radially inner wall coupled to a radially outer wall of said first plurality of walls such that said first wheel bladder is positioned radially outward from said first inner wheel portion, said inflation device coupled in flow communication with said first chamber such that said first chamber induces suction, pressure, or both to said first wheel bladder; and
      a second wheel bladder comprising a second radially inner wall coupled to a radially outer wall of said second plurality of walls such that said second wheel bladder is positioned radially outward from said second inner wheel portion.

8. The wheel system according to claim 7, wherein said inner axle comprises a first inflation aperture configured to mate with the inflation device.

9. The wheel system according to claim 8, wherein said first inner wheel portion includes a first inner wheel portion aperture that extends through said first inner wheel portion and said outer axle, said first inner wheel portion aperture configured to mate with said first inflation aperture.

10. The wheel system according to claim 7, further comprising a second wheel assembly and a third wheel assembly coupled to said axle assembly.

11. The wheel system according to claim 7, wherein each of said first and second wheel bladders is substantially filled with granules.

12. The wheel system according to claim 11, wherein the granules are a multifaceted material.

13. The wheel system according to claim 11, wherein the granules are husks, gravel, or pellets, or a combination thereof.

14. A method of fabricating a wheel system for use with a vehicle, said method comprising:
   providing an axle assembly including an inner axle and an outer axle configured to rotate about the inner axle;
   coupling an inflation device to the axle assembly such that the inner axle of the axle assembly is configured to retain the inflation device; and
   coupling a wheel assembly to the axle assembly such that the inflation device is configured to induce at least one of suction and pressure to the wheel assembly, the wheel assembly comprising:
      a first inner wheel portion comprising a first plurality of walls that combine to define a first substantially hollow chamber;
      a second inner wheel portion positioned adjacent to the first inner wheel portion, said second inner wheel portion comprising a second plurality of walls that combine to define a second substantially hollow chamber;
      a first wheel bladder comprising a first radially inner wall coupled to a radially outer wall of said first plurality of walls such that the first wheel bladder is positioned radially outward from the first inner wheel portion, wherein the inflation device is coupled in flow communication with the first chamber such that the first chamber induces suction, pressure, or both to the first wheel bladder; and
      a second wheel bladder comprising a second radially inner wall coupled to a radially outer wall of said second plurality of walls such that the second wheel bladder is positioned radially outward from the second inner wheel portion.

15. The method according to claim 14, further comprising substantially filling each of the first and second wheel bladders with granules.

16. The method according to claim 14, wherein coupling a wheel assembly to the axle assembly further comprises coupling a wheel assembly to the axle assembly such that an inner wheel portion aperture substantially mates with the inflation device.

17. The wheel assembly according to claim 1, wherein said first wheel bladder and said second wheel bladder are configured to contact a terrain over which said vehicle is configured to travel.

18. The wheel assembly according to claim 1, wherein said first wheel bladder and said second wheel bladder comprise the radially outermost components of said wheel assembly.

19. The wheel assembly according to claim 3, wherein each of said first and second wheel bladders is configured to be at least partially deflated when in contact with the terrain.

* * * * *